United States Patent [19]
Slimak et al.

[11] Patent Number: 6,146,766
[45] Date of Patent: Nov. 14, 2000

[54] ENHANCING THE STRENGTH, MOISTURE RESISTANCE, AND FIRE-RESISTANCE OF WOOD, TIMBER, LUMBER, SIMILAR PLANT-DERIVED CONSTRUCTION AND BUILDING MATERIALS, AND OTHER CELLULOSIC MATERIALS

[76] Inventors: Karen Marie Slimak; Robert Andrew Slimak, both of 9207 Shotgun Ct., Springfield, Va. 22153

[21] Appl. No.: 09/044,909

[22] Filed: Mar. 20, 1998

[51] Int. Cl.$^7$ .............................. B05D 3/04; B05D 1/18; B32B 9/04

[52] U.S. Cl. .......................... 428/453; 427/296; 427/297; 427/397.7; 427/439; 427/440; 428/537.1

[58] Field of Search .................................. 427/297, 351, 427/440, 439, 397.7, 296; 428/453, 537.1

[56] References Cited

U.S. PATENT DOCUMENTS

| | | | |
|---|---|---|---|
| 1,499,791 | 7/1924 | Shipley | 427/351 |
| 3,974,318 | 8/1976 | Lilla | 428/260 |
| 4,017,980 | 4/1977 | Kleinguenther | 34/13.4 |
| 5,080,935 | 1/1992 | Kelso, Jr. et al. | 427/351 |
| 5,478,598 | 12/1995 | Shiozawa | 427/297 |

*Primary Examiner*—Shrive Beck
*Assistant Examiner*—Michael Barr
*Attorney, Agent, or Firm*—Stevens, Davis, Miller & Mosher, L.L.P.

[57] ABSTRACT

A sodium silicate polymerization method was used to incorporate sodium silicate and/or other water soluble inorganic fire retardants into an insoluble matrix. By using a vacuum/pressure technique, a water soluble sodium silicate/borate mixture was forced into the interior of various cellulosic materials, then was heat polymerized into an insoluble fire retardant matrix. This produced a dual action fire retardant material also with the following properties: moisture resistant, weather proof, and improved strength. Water insoluble forms of sodium silicate and borates have not been possible until now. This process and testing was then repeated with six other water soluble fire retardant combinations, making them similarly water insoluble. The process was used to incorporate water soluble substances into the intercellular structures of cotton fibers, polymerized to the insoluble form in the interior, thus becoming trapped inside the fibers, producing weavable fibers, that were flexible, very strong and highly fire retardant. Because some of the best fire retardants are water soluble inorganic compounds, from both fire retardant and environmental considerations, until now, the problem of water solubility has greatly restricted the widespread use of the water soluble inorganic fire retardants. The present invention provides a very promising approach for solving this problem while providing the added properties of increased strength. It was further found that chemicals and substances could be forced to penetrate cellular interiors, and further that reactions could be caused to occur within the cells by the choice of materials, chemicals, and conditions of the infusion process.

18 Claims, 3 Drawing Sheets

ENHANCING THE STRENGTH, MOISTURE RESISTANCE, AND FIRE-RESISTANCE OF WOOD, TIMBER, LUMBER, SIMILAR PLANT-DERIVED CONSTRUCTION AND BUILDING MATERIALS, AND OTHER CELLULOSIC MATERIALS

BACKGROUND OF THE INVENTION

1. Field of the Invention

The purpose of this invention is to provide 1) impregnated wood materials introducing a fire retardant property to wood products, 2) impregnation of other cellulosic materials, such as paper and cloth, and other organic compounds in such a way as to allow their intended functions while reducing the risk of flammability, 3) impregnated wood materials introducing increased strength to wood products, and 4) impregnated wood materials introducing decreased solubility of the constituents of the final product thereby providing moisture and leachate and weather resistant products 5) incorporation of a great variety of substances into cellulosic materials to impart a wide range of new properties including strength, flexibility, durability, elasticity, colors, and great resistance to heat.

2. Description of Related Art

In my studies of fire retardants, I became interested in introducing sodium silicate and other fire retardant chemicals into flammable materials in such a way as to make the materials highly fire retardant but also resistant to the effects of weathering and leaching. The use of heat and other techniques to accelerated the polymerization of sodium silicate so as to greatly decrease the water solubility of sodium silicate and any other substances that may be incorporated into the sodium silicate matrix is described in patent application Ser. No. 08/843,160, filed Apr. 11, 1997, now U.S. Pat. No. 6,040,057 which is herein incorporated in its entirety by reference.

Although polymerized sodium silicate would become completely water insoluble through the application of the methods described in the above described patent application, this investigator felt that simply providing an insoluble form of sodium silicate would not necessarily provide the desired resistance to weathering. This investigator became particularly intrigued by the possibility of incorporating sodium silicate in its liquid state not only into the spaces between cellulosic fibers, but also into the interior of the cells themselves.

It was reasoned that introducing sodium silicate as a liquid into the cellular interiors, and while held in the cellular interior, causing the sodium silicate to polymerize, would change to form to that of a substance, that although it was able to penetrate the cellular structures as a liquid, would not be able to exit from the cellular structures as a solid, becoming effectively trapped within the cellular structures. The result would be the desired fire retardant properties as well as long term moisture resistance.

Although mild use of vacuum and pressure to pressure treat wood is known, what is new and claimed in the present invention, is the use of higher levels of vacuum and higher uses of pressure with the specific intent of forcing chemicals and other substances into the interior of the cells and cellular structures, changing the form of the substances thus introduced, so as the prevent the possibility that such substances would be able to move back out of the cellular structures as a result of other influences such as the leaching action of water.

SUMMARY OF THE INVENTION

The purpose of this invention is to provide 1) impregnated wood and wood containing materials in which the impregnating material is present not only between fibrous strands, but the material is also present within the cells themselves, 2) impregnation of other cellulosic materials, such as paper and cloth, and other organic compounds in which the impregnating material is present not only between fibrous strands, but the material is also present within the cells themselves, 3) impregnated non-cellulosic materials comprising thin tiny tubules or tubule-like materials in which the impregnating material is present not only between fibrous strands, and between tubule, or tubule-like materials, but the material is also present within the strands, tubule, or tubule-like materials themselves.

A further purpose of this invention in to provide products in such a way as to allow their intended functions while also providing one or more of the following properties or functions: 1) reducing the risk of flammability, 2) increasing strength, 3) increasing stiffness, 4) increasing resistance to thermal, heat transfer, 5) introducing decreased solubility of the constituents of the final product thereby providing moisture and leachate and weather resistant products, and increasing durability.

A further purpose of this invention is to provide an improved method for introducing new materials and chemicals into cellular interior structures by introducing substances that once introduced with undergo reactions within the cells thus providing still further new uses and materials.

DETAILED DESCRIPTION OF THE INVENTION

The purpose of this invention is to provide an improved method for introducing new materials into the interior of cellular structures, thus producing products having 1) improved fire retardant properties, 2) having greatly improved insulation properties, 3) having greatly increased strength, 4) having greatly decreased solubility of the constituents of the final product, 5) having greatly improved elasticity, 6) having greatly improved pliability, 7) having greatly improved durability, and 8) having the ability to achieve several of these desired properties simultaneously in the same product as desired.

It is a further purpose of this invention to provide method of introducing liquid products into cellular interiors in which complete or partial solidification or polymerization is accomplished by the addition of heat in sufficient quantities to achieve the desired change in solubility or physical form (eg from a liquid to a solid) without also accomplishing a deterioration of the heat exposed structures. Such heat sources to include but not be limited to dry hot air heat, radiant heat, microwave radiation, infrared heat, heat and pressure combinations, steam at any desired temperature. Such changes may further be accomplished by curing processes involving sunlight, lasers, photolytic processes and the like.

It is a further purpose to introduce, latex-like materials, other materials easily converted from liquid to solid or semi solid states, enzymatic catalysts to cause major cellular changes, chemicals to facilitate binding to cellular interiors after substances are forced into the interiors of the cells.

It is a further purpose to specifically introduce substances into cellular interiors that will be involved in reactions intracellularly that will provide still new and improved properties, such as causing swelling, incorporating hydrated substances inside of cells, improved strength, and improved insulation.

It is a further purpose to modify cellular structures, or tubular materials in order to facilitate the penetrating capabilities of the materials.

It is a further purpose of this invention to provide a product where the vitrification is achieved through partial or total infiltration with exposure to, or infusion with, or application by any appropriate means, of an aqueous composition containing an alkali metal silicate and which may contain one or more added constituents including but not limited to one or more of a detergent, an accelerant and elastacizers which upon heating will be converted into a composition which, upon cooling, is insoluble, and resistant to pressure and heat.

It is a further purpose of this invention to incorporate compositions by any appropriate means into such products other including other alkali metal silicates, inorganic compounds, organic compounds, and combinations thereof that may become trapped, incorporated, combined, bound, and the like in the matrix during the process of vitrification and thus be retained in the final product, further enhancing properties including but not limited to fire retardant properties, insect resistance, strength, hardness, durability, texture and color.

It is a further purpose of this invention to incorporate such compositions either simultaneously, sequentially, or both simultaneously and sequentially by any appropriate means into such products other including other alkali metal silicates, inorganic compounds, organic compounds, and combinations thereof that may become trapped, incorporated, combined, bound, and the like in the matrix during the process of vitrification and thus be retained in the final product, further enhancing properties including but not limited to fire retardant properties, insect resistance, strength, hardness, durability, texture and color.

It is a further purpose of this invention to accomplish the desired improvements in strength and reduced solubility by infusion of energy into the product. Such energy infusion includes but is not limited to radiant heat, electrical current, microwaves, lasers, convection ovens, dehydration, spot heating to high temperatures for short periods of time, and the like.

It is a further purpose of this invention to accomplish the desired improvements in strength and reduced solubility by techniques that achieve the desired improvements without substantial destruction of the interior structure of the wood, cellulosic or other substance as the initial starting material.

It is a further purpose of this invention to accomplish the desired improvements in strength and reduced solubility by techniques that achieve the desired improvements while in the process causing substantial alteration, destruction, or change, combination of starting materials and treatment substances, so as to achieve a final product possessing the desired improvements in strength, reduced solubility, fire retardant properties, insect resistance, strength, hardness, durability, texture, color and the like.

It is a further purpose of this invention to provide improved products of wood, timber, lumber, similar plant derived construction and building materials, other materials of cellulosic origin, other materials of organic origin, and other materials containing constituents including wood, lumber, similar plant derived, cellulosic and/or organic materials that are impregnated with alkali metal silicate, by any desired means including pressure treating, soaking, spraying, painting, washing, dipping, rubbing, mixing, blending, infusion and the like, and rendered impervious to water by the application of heat in such a way as to avoid substantial adverse effects of heat or other energy source.

It is a further purpose of this invention to provide improved products of wood, timber, lumber, similar plant derived construction and building materials, other materials of cellulosic origin, other materials of organic origin, and other materials containing constituents including wood, lumber, similar plant derived, cellulosic and/or organic materials that are impregnated with sodium silicate, by any desired means including pressure treating, soaking, spraying, painting, washing, dipping, rubbing, mixing, blending, infusion and the like, and rendered impervious to water by the application of heat in such a way as to avoid substantial adverse effects of heat or other energy source.

It is a further purpose of this invention to accomplish the desired change in properties of sodium silicate by applying heat to at high enough levels to effect the change to insolubility of sodium silicate in a short enough period of time that the water content of wood or other cellulosic materials provides a localized cooling effect of the water thus providing both protection against destruction and at the same time in some cases participating in the vitrification process.

SUMMARY OF THE EMBODIMENTS

The method embodiment includes methods for modifying wood and other cellulosic material to produce an improved product that is stronger, fire retardant, moisture resistant, insect resistant, utilizing approaches that do not damage the wood. These can be variously accomplished through the introduction of any liquid or semiliquid material into the interior of cellular structures, and causing changes to that material such that the material is no longer able to be released or leached from the cellular structures.

Other substances may also be incorporated into the cellular matrix thus also become trapped inside the cellular structures.

The pressures used ranged from 50–500 psi.

The strategy was to apply sufficient vacuum to cause cellular structures to enlarge (swell), and while enlarged to rapidly introduce the desired substance at a sufficiently high vacuum to cause penetration into the cellular interiors.

The strategy was to use the cooling effect of water to cool and protect the wood while the sodium silicate transformation was occurring at higher temperature on the surface, and in the case of microwave heating, the water in the interior is converted to steam, which is much higher in temperature than the boiling point of water, and this higher temperature would cause the conversion of sodium silicate from the water soluble to the water insoluble form.

EXAMPLES OF THE EMBODIMENTS

EXAMPLE 1

Figure 1:
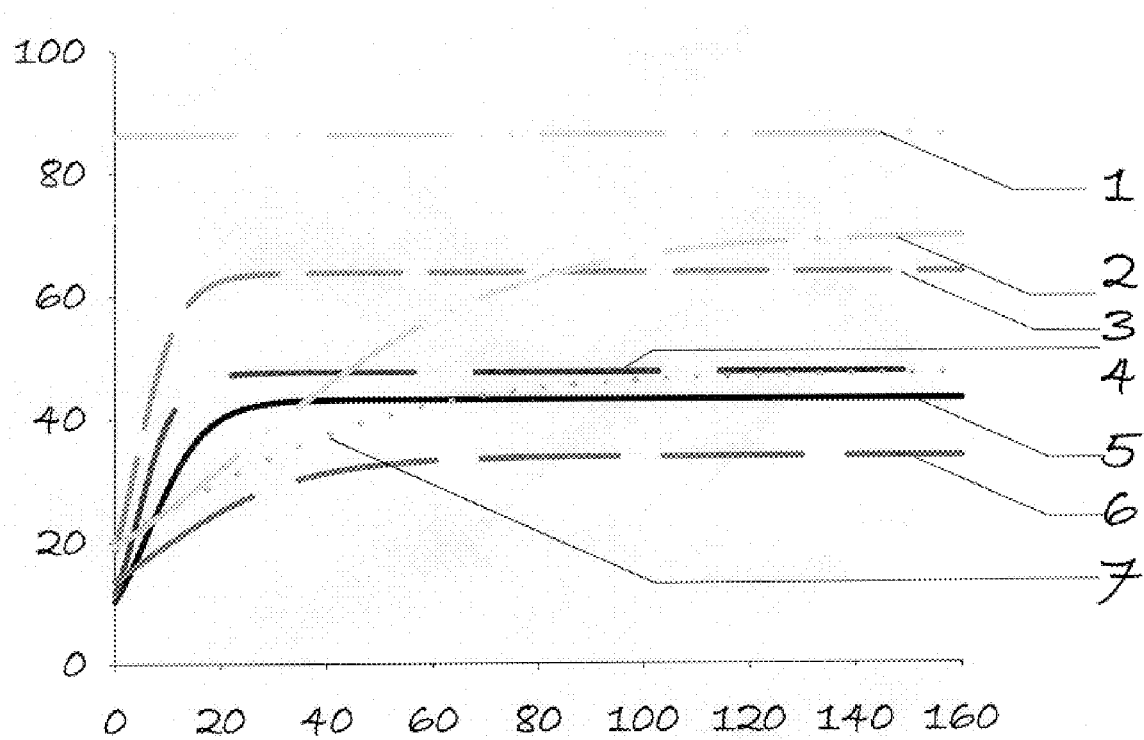
FIG. 1 is a graphic representation of the effect of repeated soaking cycles on fire-retardant properties of sodium silicate mixtures, where the curves of the graph illustrate the relationship between actual immersion time and fire chamber weight loss.

The following substances were selected for incorporation into a sodium silicate matrix as part of fire retardant treatment studies:

7:3 boric acid/sodium borate saturated solution
antimony chloride saturated solution
aluminum hydroxide saturated solution
ammonium phosphate
urea phosphate Separate samples of pine, each 4.5×12.5×0.6 cm were infused with a combination of sodium silicate, and each of the chemicals listed above, in the following manner: The wood samples were placed in an aluminum test chamber and subjected to a vacuum of −29.975 mm Hg for 30 minutes. The purpose of the vacuum treatment was to remove air from the interior of the samples, and cause expansion of the samples. Then after the chamber was evacuated, the valve leading to the vacuum source was closed, and a valve leading to the sodium silicate/fire retardant mixture was opened, causing and instantaneous change from high vacuum to high pressure, eg 300 psi. The pressure was maintained for 30 minutes. At the end of this time, the pressure was released and the samples were removed from the chamber. Excess solution was then removed from the surface by wiping, and the samples were thoroughly dried.

The samples were again placed into the chamber and the samples were placed in an aluminum test chamber and subjected to a vacuum of −29.975 mm Hg for 30 minutes. The purpose of the vacuum treatment was to remove air from the interior of the samples, and cause expansion of the samples. Then after the chamber was evacuated, the valve leading to the vacuum source was closed, and a valve leading to the sodium silicate/fire retardant mixture was opened, causing and instantaneous change from high vacuum to high pressure, eg 300 psi. The pressure was maintained for 30 minutes. At the end of this time, the pressure was released and the samples are removed from the chamber. Excess sodium silicate solution was then removed from the surface by wiping, and the samples were thoroughly dried.

The samples were then air dried for 24 hours and exposed to a microwave energy source at 6500 W, 2450 MH on a rotating plate for 10 minutes.

Solubility The method described by Lyons (1970) was used to test the effect of moisture on fire retardant properties of samples. Pine rods, 21.5 cm×0.6 cm were infused with sodium silicate matrix combinations as described above. Rods for each chemical and control were placed in separate soaking chambers. Daily, the rods were immersed in water for 8 hours and air dried for 16 hours, for 20 days. Each day 3 rods were removed from each chamber, dried for 2 days, and subjected to flame tests measuring % weight loss. The data for each day was recorded to determine the changes in weight loss obtained over time as a result of any solubilization occurring during the soaking cycles.

Fire retardant properties: The percent weight loss will be determined as described above for three replicates of each sample.

Thermal imaging: Flit Systems Thermovision 550 was used simultaneously with burn weight loss studies. A butane flame was directed to one side of a 4.5×12.5×0.6 cm treated sample; the flame was directed to the lowest possible area, without flame passing under and/or to the front of the sample. The Thermovision measurements were taken from the opposing side of the sample, 0.6 cm in thickness. Continuous temperature measurements were obtained of all points in the sample and the surrounding area during the entire burn run, so that initial temperatures could be measured, as well as changes in thermal readings over time. Sample location, and ambient conditions were constant for all samples studied. One sample of each treatment method for all samples types, and all appropriate controls were analyzed using this system.

Structural integrity: In order for the samples to be useable in practical applications, a cone-depression test was performed. Each of the series of samples were subjected to the cone-depression test, in which a 205.6 g plumb bob was dropped vertically from height of 34.2 cm onto the surface of the sample. Depth of depression will be measured, and the sample will be examined for any visible signs of stress and/or breakage.

Solubility studies performed with 200 rods demonstrated leaching only occurred within the first three days of leaching. Essentially no leaching occurred after three days, and overall results were better than that reported in the literature. 200 small pine rods, 21.5 cm (lenghth)×6 cm (diameter), treated by vacuum/pressure method with chemicals listed in FIG. 1 in a sodium silicate matrix were dried and alternatively emerged in distilled water baths for 8 hours and air dried for 16 hours over a total period of 160 hour immersion or twenty days. See FIG. 1.

Curves [1–7] illustrate the relationship between actual immersion time and fire chamber weight loss. FIG. 1 compares the differences in percent weight loss of rods treated as follows:

[1] untreated control
[2] sodium silicate, not polymerized control
[3] ammonium phosphate w/sodium silicate matrix
[4] antimony chloride w/sodium silicate matrix
[5] borax/boric acid w/sodium silicate matrix
[6] aluminum hydroxide w/sodium silicate matrix
[7] sodium silicate polmerized The y-axis of FIG. 1 presents the percent weight loss from 0to 100 percent in burn studies of the above treated rods [1]–[7] indicating retention of polymerized sodium silicate matrices within pine rods following leaching studies by changes in percent weight loss of treated samples subjected to a flame. Along the x-axis, percent weight loss is present for treated samples [1]–[7] according to the numbers of hours the treated samples were leached in water.

Figure 2:
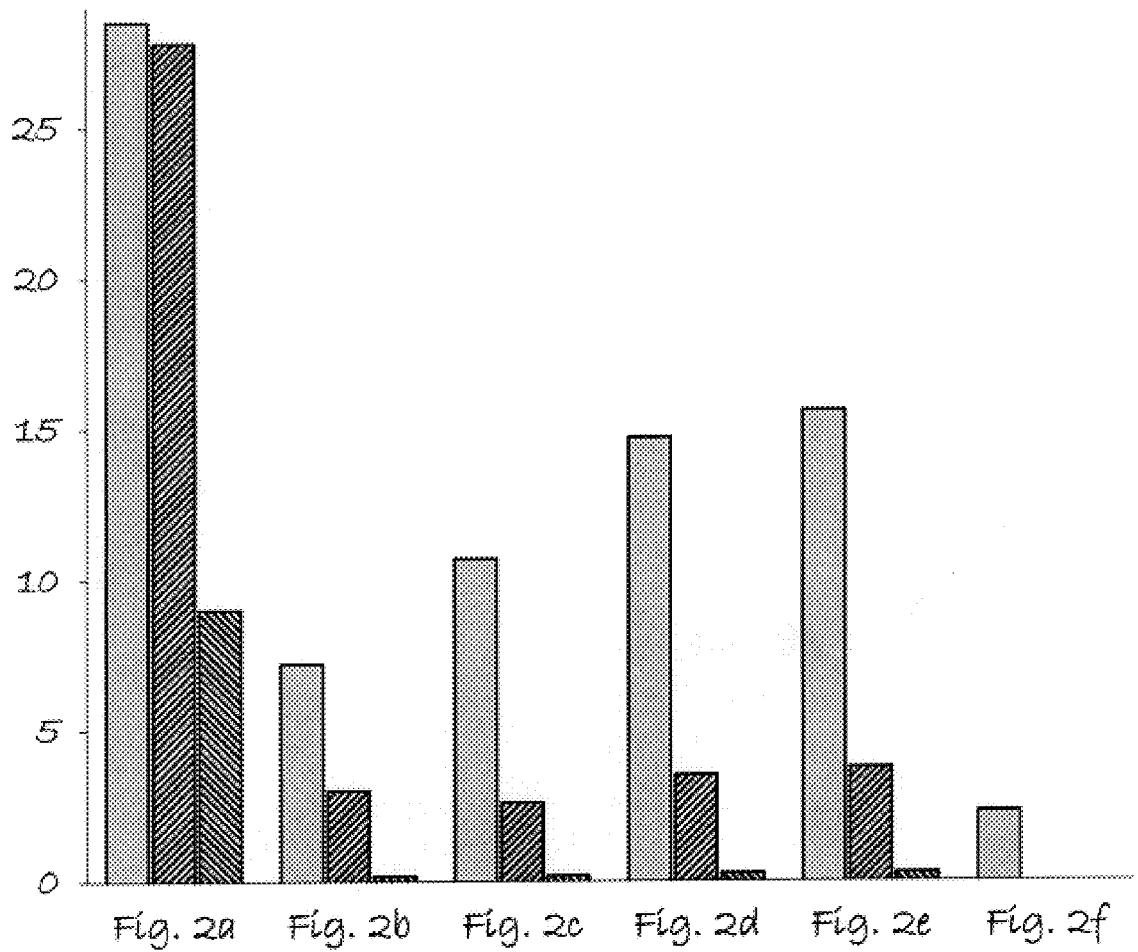
FIG. 2 is a graphic representation of heat transfer in polymerized samples.

FIG. 2 shows the insulative properties of sodium silicate and sodium silicate fixtures using the instant treatment method. All treated samples were improved over untreated controls. Best results were achieved with the ammonium phosphate/sodium silicate mixture.

FIG. 2 illustrates the area of sample measured at or above 150° C., 320° C. and 450° C., respectively, following heating of 0.635 cm pine cross-section for 3.22 minutes with 1100° C. flame.

FIG. 2 compares heat transfer in polymerized samples. Samples of pine (0.635 cm cross sections) were treated with the sodium silicate matrices listed in FIG. 2a through 2f, and then heated for 3.22 minutes by contact wiht a 1100° C. flame. The temperature of the opposite side of the section was measured after 3.22 minutes by thermal imaging. The y-axis presents the area, as $cm^2$, ranging from 0–30 of each sample reaching the temperatures, 150° C., and 450° C. on the opposite side of each sample. The results for the samples tested are presented along the x-axis [FIGS. 2a–2f]. Three columns are presented for each sample: the grey column to the left presents the area measured at 150° C. and above; the left hatched column in the center presents the area measured at 320° C. and above; the right hatched column to the right presents the area measured at 450° C. and above. The samples studies are as follows:

[FIG. 2a] untreated control
[FIG. 2b] sodium silicate only

[FIG. 2c] aluminum hydroxide/sodium silicate
[FIG. 2d] boric acid/sodium borate/sodium silicate
[FIG. 2e] antimony chloride/sodium silicate
[FIG. 2f] ammonium phosphate/sodium silicate.

In hardness tests, all samples were found to be harder that the untreated controls.

EXAMPLE 2

The vacuum/pressure method of Example 1 was used first to force:

7:3 boric acid/sodium borate saturated solution
antimony chloride saturated solution
aluminum hydroxide saturated solution
ammonium phosphate
urea phosphate into the interior of the fabric samples, and subsequently to force sodium silicate into the cellular interiors of fabric and cloth samples.

Samples of cotton batting, felt, knit, sheeting, thread, cheese cloth, and doilies were treated teh vacuum/pressure method of Example 1. Each cloth sample was approximately 25 cm$^2$. After removal from the chamber excess sodium silicate mixture was removed by blotting with absorbent material. After drying under ambient conditions for 1 hour the samples were then subjected to two 7-minute intervals of the previously described microwave treatment.

Samples of composite materials were also prepared for each of the treatment combinations. Sodium silicate was mixed with the chemicals listed above to make pressed wood samples. The particle board and wafer board samples were made with the same press and procedure described above in step 1. The additional chemical was mixed as dry powder with the dry sawdust or wafers before the sodium silicate was added. This minimized the amount of water in the pressed wood samples and avoided any pre-mixing reactions. The procedure consisted of mixing 80 grams of dry wafers or sawdust with 10 grams of chemical. Once the mixing was complete, sodium silicate was added slowly to the dry mixture, while being stirred. Sodium silicate was added until the desired consistency was obtained with all parts of the mixture moistened, with no dry parts, and with the additional chemical mixed in thoroughly. The mixture was then poured into the same presses used in step 1, and then clamped down for a 24-hour period. After the 24 hour period, the samples were removed from the press, cut into 4 smaller samples, allowed to dry, and subjected to burn tests and thermal imaging analysis.

The materials thus produced were tested for flammability, thermal measurements were performed, and samples were analyzed microscopically. As a thermal measurement a point probe, having a temperature of 454° C. was placed in contact with one side of the sample. Changes in temperature were measured by placing a thermometer directly on the opposite side of the sample of cotton felt material, thickness, 2 mm and measuring the change in temperature over time.

Figure 3:
FIG. 3 is an image of cellulosic fiber showing evidence of intra-cellular reactions between sodium silicate and ammonium phosphate.

FIG. 3 is an image of a cellulosic fiber showing evidence of intracelluylar reactions between sodium silicate and ammonium phosphate.

The cellulosic fiber of FIG. 3 is a cotton fiber treated with ammonium phosphate and sodium silicate which shows evidence of cellular penetration and intracellular chemical reaction.

We claim:

1. A process of imparting fire retardant and moisture resistance properties to a cellulosic material comprising applying and infusing a material comprising an alkali metal silicate solution by alternately applying vacuum and pressure to effect penetration of cellular walls of the cellulosic material by said solution, applying energy to the said material under sufficient conditions to thereby cause the alkali metal silicate to become water insoluble.

2. The process of claim 1 wherein the pressure is applied at 500 psi.

3. The process of claim 1 wherein the pressure ranges from 200–500 psi.

4. The process of claim 1 wherein the pressure ranges from 50–300 psi.

5. The process of claim 1 wherein the pressure ranges from 50–500 psi.

6. The process of claim 1 wherein the pressure ranges from 50–200 psi.

7. The product produced by the process of claim 1 wherein the product possesses the property of increased hardness and durability.

8. The product produced by the process of claim 1 where the product possesses the property of increased fire retardance.

9. The product produced by the process of claim 1 wherein the product possesses the property of improved resistance to heat transfer.

10. The process of claim 1, wherein said alternately applying steps permit the alkali metal silicate solution to enter the interior of the cells of the cellulosic material as a liquid and said applying energy step causes the alkali metal silicate to become water insoluble and effectively trapped within the cells of the cellulosic material.

11. The process of claim 1, wherein said vacuum is of sufficient degree to cause said cellular structures to enlarge.

12. A process of trapping a liquid or water soluble solid within a cellulosic material comprising applying and infusing a material comprising an alkali metal silicate solution by alternately applying vacuum and pressure to effect penetration of cellular walls of the cellulosic material by said solution, inserting at least one other substance selected from liquids and water soluble solids by alternately applying vacuum and pressure to said one other substance to also effect penetration of the cellular walls of the cellulosic material with said at least one other substance, applying energy to said material under sufficient conditions to thereby cause the alkali metal silicate to become water insoluble and trapping said one other substance within cells of the cellulosic material.

13. The process of claim 12, wherein said other substance is selected from the group of inorganic and organic compounds and combinations thereof.

14. The process of claim 12, wherein said other substance reacts with said alkali metal silicate solution within said cells.

15. The process of claim 12, wherein said alkali metal silicate solution and said other substance are simultaneously infused.

16. The process of claim 12, wherein said alkali metal silicate solution and other substance are sequentially infused.

17. The process of claim 12, wherein said other material includes a second alkali metal silicate solution different from said first alkali metal solution.

18. The process of claim 12, wherein said vacuum is of sufficient degree to cause said cellular structures to enlarge.

* * * * *